(12) United States Patent
Chong et al.

(10) Patent No.: US 9,462,298 B2
(45) Date of Patent: Oct. 4, 2016

(54) LOOP FILTERING AROUND SLICE BOUNDARIES OR TILE BOUNDARIES IN VIDEO CODING

(75) Inventors: In Suk Chong, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 846 days.

(21) Appl. No.: 13/598,375

(22) Filed: Aug. 29, 2012

(65) Prior Publication Data

US 2013/0101016 A1    Apr. 25, 2013

Related U.S. Application Data

(60) Provisional application No. 61/550,211, filed on Oct. 21, 2011.

(51) Int. Cl.
    *H04N 7/26*     (2006.01)
    *H04N 19/82*    (2014.01)

(52) U.S. Cl.
    CPC ................. *H04N 19/82* (2014.11)

(58) Field of Classification Search
    CPC ..................................... H04N 19/82
    USPC .................................... 375/240.02
    See application file for complete search history.

(56) References Cited

U.S. PATENT DOCUMENTS

| 2008/0267297 A1 | 10/2008 | Sampedro et al. |
| 2009/0002379 A1 | 1/2009 | Baeza et al. |
| 2010/0245672 A1* | 9/2010 | Erdler et al. ............ 348/608 |
| 2010/0329362 A1 | 12/2010 | Choi et al. |
| 2011/0026600 A1 | 2/2011 | Kenji |
| 2012/0012118 A1 | 1/2012 | Ponsi et al. |
| 2013/0156111 A1 | 6/2013 | Lee et al. |

FOREIGN PATENT DOCUMENTS

| JP | 2009278179 A | 11/2009 |
| JP | 2011035620 A | 2/2011 |
| WO | WO 2011127961 A1 * | 10/2011 |
| WO | 2012005521 A2 | 1/2012 |

OTHER PUBLICATIONS

Tsai et al. "Slice Boundary Processing and Picture Layer Raw Byte Sequence Payload". JCTVC-D128, Jan. 2011. Date Saved: Jan. 19, 2011, pp. 1-14.*

(Continued)

*Primary Examiner* — Farzana Hossain
*Assistant Examiner* — Zhihan Zhou
(74) *Attorney, Agent, or Firm* — Shumaker & Sieffert, P.A.

(57) ABSTRACT

The techniques of this disclosure apply to loop filtering across slice or tile boundaries in a video coding process. In one example, a method for performing loop filtering in a video coding process includes determining that pixels corresponding to filter coefficients of a filter mask for a loop filter are across a slice or tile boundary, removing filter coefficients corresponding to the pixels across the slice or tile boundary from the filter mask, renormalizing the filter mask without the removed filter coefficients, performing loop filtering using the renormalized filter mask.

24 Claims, 13 Drawing Sheets

(56) References Cited

OTHER PUBLICATIONS

Chen et al., "Adaptive Loop Filter with Zero Pixel Line Buffers for LCU-based Decoding," Joint Collaborative Team on Video Coding, JCTVC-F054, Jul. 14-22, 2011, 11 pp.
Fu et al., "Sample Adaptive Offset with Zero Pixel Line Buffers for LCU-based Decoding," Joint Collaborative Team on Video Coding, JCTVC-F055, Jul. 14-22, 2011, 8 pp.
Hsu et al., "Deblocking Filter with Reduced Pixel Line Buffers for LCU-based Processing," Joint Collaborative Team on Video Coding, JCTVC-F053, Jul. 14-22, 2011, 7 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Itu-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Itu-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Fu et al., "Sample Adaptive Offset with Padding at LCU, Slice, and Image Boundaries", JCT-VC Meeting; MPEG Meeting; Jul. 14-22, 2011; Torino, IT; (Joint Collaborative Team on Video Coding, of ITU-T SG16 WP3 and ISO/IEC JTC1/SC29/WG11), No. JCTVC-F093, XP030009116, 7 pp.
Fuldseth, "Replacing slices with tiles for high level parallelism," MPEG Meeting; Jan. 24-28, 2011; Daegu, KR; (Motion Picture Expert Group or ITU-T SG16 WP3 and ISO/IEC JTC1/SC29/WG11), No. JCTVC-D227, XP030047556, 5 pp.
Tsai et al., "Slice Boundary Processing and Picture Layer Raw Byte Sequence Payload," JCT-VC Meeting; MPEG Meeting; Jan. 20-28, 2011; Daegu, KR; (Joint Collaborative Team on Video Coding of ITU-T SG16 WP3 and ISO/IEC JTC1/SC29/VVG11), No. JCTVC-D128, XP030008168, 13 pp.
Wan et al., "Comments on specifying tile support in HEVC Profiles and Levels," JCT-VC Meeting; MPEG Meeting; Feb. 1-10, 2012; San Jose, CA; (Joint Collaborative Team on Video Coding of ISO/IECJTC1/SC29/WG11 and ITU-T SG.16); No. JCTVC-H0463, XP030111490, 11 pp.
Wang et al., "Dependency and loop filtering control over tile boundaries," MPEG Meeting; Nov. 21-30, 2011; Geneva, CH; (Motion Picture Expert Group or ITU-T SG16 WP3 and ISO/IEC JTC1/SC29/WG11), No. JCTVC-G317, XP030050442, 7 pp.
International Search Report and Written Opinion from International Application No. PCT/US2012/053176, dated Nov. 26, 2012, 14 pp.
Second Written Opinion from Internatioal Application No. PCT/US2012/053176, dated Sep. 18, 2013, 12 pp.
International Preliminary Report on Patentability from International Application No. PCT/US2012/053176, dated Jan. 15, 2014, 10 pp.
Chen C Y., et al., "Non-CE8.c.7: Single-Source SAO and ALF Virtual Boundary Processing with Cross9×9," Joint collaborative Team on Video Coding (JCT-VC) of ITU-T SG16 WP3 and ISO/IEC JTC1/SC29/WG11, 7th Meeting Geneva, CH, Nov. 21-30, 2011, JCTVC-G212_r1, pp. 1-25.
Fuldseth A., et al., "Tiles," Source: Cisco Systems, eBrisk Video, Sharp, and Texas Instruments, Joint Collaborative Team on Video Coding (JCT-VC) of ITU-T SG16 WP3 and ISO/IEC JTC1/SC291/WG11, JCTVC-F335, 6th Meeting: Torino, IT, Jul. 14-22, 2011, 15 pages.

\* cited by examiner

120

| 0 | 1 | 4 | 5 |
|---|---|---|---|
| 15 | 2 | 3 | 6 |
| 14 | 11 | 10 | 7 |
| 13 | 12 | 9 | 8 |

FIG. 2

LOOP FILTERING AROUND SLICE BOUNDARIES OR TILE BOUNDARIES IN VIDEO CODING

This application claims the benefit of U.S. Provisional Application No. 61/550,211, filed Oct. 21, 2011, the entire content of which is incorporated herein by reference.

TECHNICAL FIELD

This disclosure relates to video coding, and more particularly to techniques for loop filtering in a video coding process.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. In particular, this disclosure describes techniques for an loop filtering processes for video coding. The techniques of this disclosure may apply to loop filtering across slice or tile boundaries. Loop filtering may include one or more of adaptive loop filtering (ALF), sample adaptive offset (SAO) filtering, and deblocking filtering.

In one example of the disclosure, a method for performing loop filtering in a video coding process is proposed. The method includes determining, for a current pixel, that one or more pixels corresponding to filter coefficients of a filter mask for an loop filter are across one of a slice or a tile boundary, and performing loop filtering on the current pixel using a partial loop filter.

In one example, the method may further include removing the filter coefficients corresponding to the one or more pixels across the slice or tile boundary from the filter mask, and creating a partial filter mask for the partial loop filter using the remaining filter coefficients in the filter mask. This example may further include renormalizing the partial filter mask, wherein performing loop filtering comprises performing loop filtering on the current pixel using the partial loop filter with the renormalized partial filter mask.

In another example, the method may further include removing first filter coefficients corresponding to the one or more pixels across the slice or tile boundary from the filter mask, removing second filter coefficients corresponding to pixels on the inside of the slice and tile boundary in order to maintain a symmetrical filter mask relative to the removed first filter coefficients, and creating a partial filter mask for the partial loop filter using the remaining filter coefficients in the filter mask.

The details of one or more examples are set forth in the accompanying drawings and the description below. Other features, objects, and advantages will be apparent from the description and drawings, and from the claims.

BRIEF DESCRIPTION OF DRAWINGS

FIG. 2 is a conceptual diagram showing region-based classification for an adaptive loop filter.

DETAILED DESCRIPTION

Figure 1:
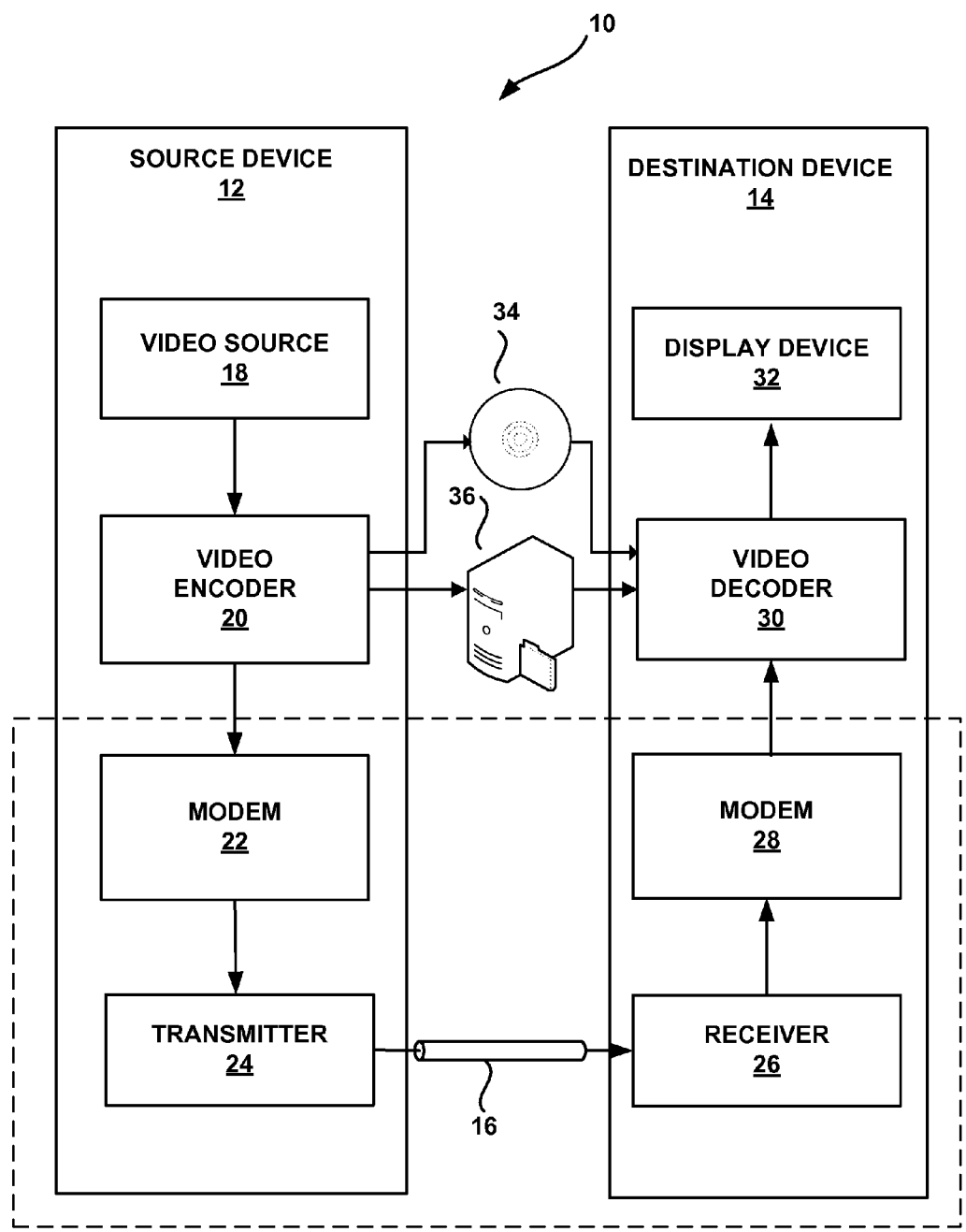
FIG. 1 is a block diagram illustrating an example video encoding and decoding system

In general, this disclosure describes techniques for coding video data. In particular, this disclosure describes techniques for loop filtering in a video coding process.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

There is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 6" or "WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of Jun. 1, 2012, is downloadable from http://phenix.int-evry.fr/jct/doc_end_user/documents/8_San %20Jose/wg11/JCTVC-H1003-v22.zip.

A recent latest WD of HEVC, and referred to as HEVC WD7 hereinafter, is available, as of Aug. 2, 2012, from http://phenix.int-evry.fr/jct/doc_end_user/documents/9_Geneva/wg11/JCTVC-I1003-v6.zip.

For video coding according to the current working draft of HEVC, as one example, a video frame may be partitioned into coding units. A coding unit (CU) generally refers to an image region that serves as a basic unit to which various coding tools are applied for video compression. A CU usually has a luminance component, which may be denoted as Y, and two chroma components, which may be denoted as Cr and Cb. Depending on the video sampling format, the size of the Cr and Cb components, in terms of number of samples, may be the same as or different from the size of the Y component. A CU is typically square, and may be considered to be similar to a so-called macroblock, e.g., under other video coding standards such as ITU-T H.264.

To achieve better coding efficiency, a coding unit may have variable sizes depending on video content. In addition, a coding unit may be split into smaller blocks for prediction or transform. In particular, each coding unit may be further partitioned into prediction units (PUs) and transform units (TUs). Prediction units may be considered to be similar to so-called partitions under other video coding standards, such as H.264. Transform units (TUs) refer to blocks of residual data to which a transform is applied to produce transform coefficients.

Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block", "partition," or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is not predicatively coded, intra-prediction mode encoded, or inter-prediction mode encoded. For intra coding, a PU may be treated the same as a leaf transform unit described below.

To code a block (e.g., a prediction unit (PU) of video data), a predictor for the block is first derived. The predictor can be derived either through intra (I) prediction (i.e. spatial prediction) or inter (P or B) prediction (i.e. temporal prediction). Hence, some prediction units may be intra-coded (I) using spatial prediction with respect to neighboring reference blocks in the same frame, and other prediction units may be inter-coded (P or B) with respect to reference blocks in other frames. The reference blocks used for prediction may include actual pixel values at so-called integer pixel positions as reference samples, or synthesized pixel values produced by interpolation at fractional pixel positions as reference samples.

Upon identification of a predictor, the difference between the original video data block and its predictor is calculated. This difference is also called the prediction residual, and refers to the pixel differences between the pixels of the block to be coded and corresponding reference samples (which may be integer-precision pixels or interpolated fractional-precision pixels, as mentioned above) of the reference block, i.e., predictor. To achieve better compression, the prediction residual (i.e., the array of pixel difference values) is generally transformed from the pixel (i.e., spatial) domain to a transform domain, e.g., using a discrete cosine transform (DCT), integer transform, Karhunen-Loeve (K-L) transform, or other transform. The transform domain may be, for example, a frequency domain.

Coding a PU using inter-prediction involves calculating a motion vector between a current block and a block in a reference frame. Motion vectors are calculated through a process called motion estimation (or motion search). A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may be interpolated, in whole or in part, and occur at a fractional pixel position. Upon finding a portion of the reference frame that best matches the current portion, the encoder determines the current motion vector for the current portion as the difference in the location from the current portion to the matching portion in the reference frame (e.g., from the center of the current portion to the center of the matching portion).

In some examples, an encoder may signal the motion vector for each portion in the encoded video bitstream. The signaled motion vector is used by the decoder to perform motion compensation in order to decode the video data. However, signaling the original motion vector directly may result in less efficient coding, as a large number of bits are typically needed to convey the information.

Once motion estimation is performed to determine a motion vector for a current portion, the encoder compares the matching portion in the reference frame to the current portion. This comparison typically involves subtracting the portion (which is commonly referred to as a "reference sample") in the reference frame from the current portion and results in so-called residual data, as mentioned above. The residual data indicates pixel difference values between the current portion and the reference sample. The encoder then transforms this residual data from the spatial domain to a transform domain, such as the frequency domain. Usually, the encoder applies a discrete cosine transform (DCT) to the residual data to accomplish this transformation. The encoder performs this transformation in order to facilitate the compression of the residual data because the resulting transform coefficients represent different frequencies, wherein the majority of energy is usually concentrated on a few low frequency coefficients.

Typically, the resulting transform coefficients are grouped together in a manner that enables entropy coding, especially if the transform coefficients are first quantized (rounded). The encoder then performs statistical lossless (or so-called "entropy") encoding to further compress the run-length coded quantized transform coefficients. After performing lossless entropy coding, the encoder generates a bitstream that includes the encoded video data.

The video encoding process may also include a so-called "reconstruction loop" whereby encoded video blocks are decoded and stored in a reference frame buffer for use as reference frames for subsequently coded video blocks. The reference frame buffer also is referred to as the decoded picture buffer or DPB. The reconstructed video blocks are often filtered before storing in the reference frame buffer. Filtering is commonly used, for example, to reduce blockiness or other artifacts common to block-based video coding. Filter coefficients (sometimes called filter taps) may be defined or selected in order to promote desirable levels of video block filtering that can reduce blockiness and/or improve the video quality in other ways. A set of filter coefficients, for example, may define how filtering is applied along edges of video blocks or other locations within video blocks. Different filter coefficients may cause different levels of filtering with respect to different pixels of the video blocks. Filtering, for example, may smooth or sharpen differences in intensity of adjacent pixel values in order to help eliminate unwanted artifacts.

As one example, a deblocking filter may be used to improve the appearance (e.g., smooth the edges) between blocks of coded video data. Another example filter is a sample adaptive offset (SAO) filter that is used to add offset to reconstructed blocks of pixels to improve image quality and coding efficiency. Another type of filter that is used in the reconstruction loop in one proposal for HEVC is the adaptive loop filter (ALF). The ALF is typically performed after a deblocking filter. The ALF restores the fidelity of pixels degraded by the video coding compression process. The ALF attempts to minimize the mean squared error between the original pixel values in the source frame and those of the reconstructed frame. An ALF is also applied at the output of a video decoder in the same fashion as was applied during the encoding process. Collectively, any filter used in the reconstruction loop may be referred to as a "loop filter." Loop filters may include one or more deblocking filters, SAO filters, and ALFs. In addition, other types of filters for use in the reconstruction loop are also possible.

This disclosure presents techniques for loop filtering. In particular, this disclosure presents techniques for loop filtering around slice and tile boundaries. The techniques of this disclosure may be applied to any loop filter, including deblocking, ALF, and SAO filters.

FIG. 1 is a block diagram illustrating an example video encoding and decoding system 10 that may be configured to utilize techniques for loop filtering in a video coding process in accordance with examples of this disclosure. As shown in FIG. 1, the system 10 includes a source device 12 that transmits encoded video to a destination device 14 via a communication channel 16. Encoded video data may also be stored on a storage medium 34 or a file server 36 and may be accessed by the destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for loop filtering in a video coding process, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 1, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 1, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 1, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the High Efficiency Video Coding (HEVC) standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure for loop filtering in a video coding process. Likewise, the video decoder 30 may implement any or all of these techniques for loop filtering in a video coding process. A video coder, as described in this disclosure, may refer to a video encoder or a video decoder. Similarly, a video coding unit may refer to a video encoder or a video decoder. In this context, a video coding unit is physical hardware and differs from the CU data structure discussed above. Likewise, video coding may refer to video encoding or video decoding.

Figure 2:
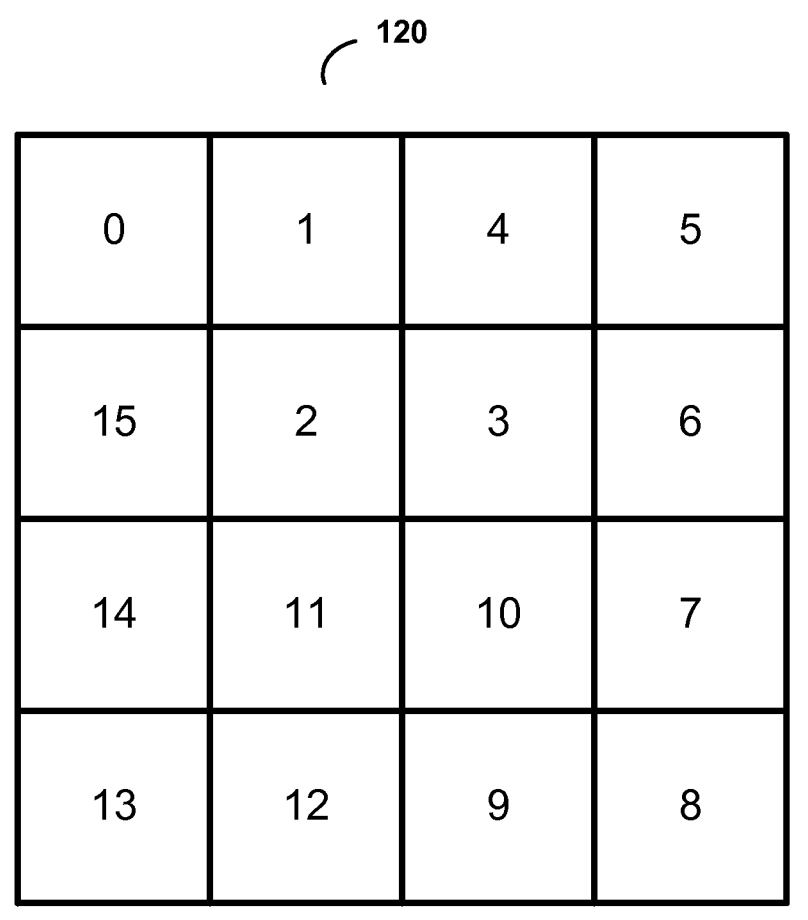

In one ALF proposal for HEVC, two adaptation modes (i.e., block and region adaptation modes) are proposed. For region adaptive mode, a frame is divided into 16 regions, and each region can have one set of linear filter coefficients (a plurality of AC coefficients and one DC coefficient) and one region can share the same filter coefficients with other regions. FIG. 2 is a conceptual diagram showing region-based classification for an adaptive loop filter. As shown in FIG. 2, frame 120 is divided into 16 regions, and each region may include multiple CUs. Each of these 16 regions is represented by a number (0-15) that indicates the particular set of linear filter coefficients used by that region. The numbers (0-15) may be index numbers to a predetermined set of filter coefficients that are stored at both a video encoder and a video decoder. In one example, a video encoder may signal, in the encoded video bitstream, the index number of the set of filter coefficients used by the video encoder for a particular region. Based on the signaled index, a video decoder may retrieve the same predetermined set of filter coefficients to use in the decoding process for that region. In other examples, the filter coefficients are signaled explicitly for each region.

Figure 3:
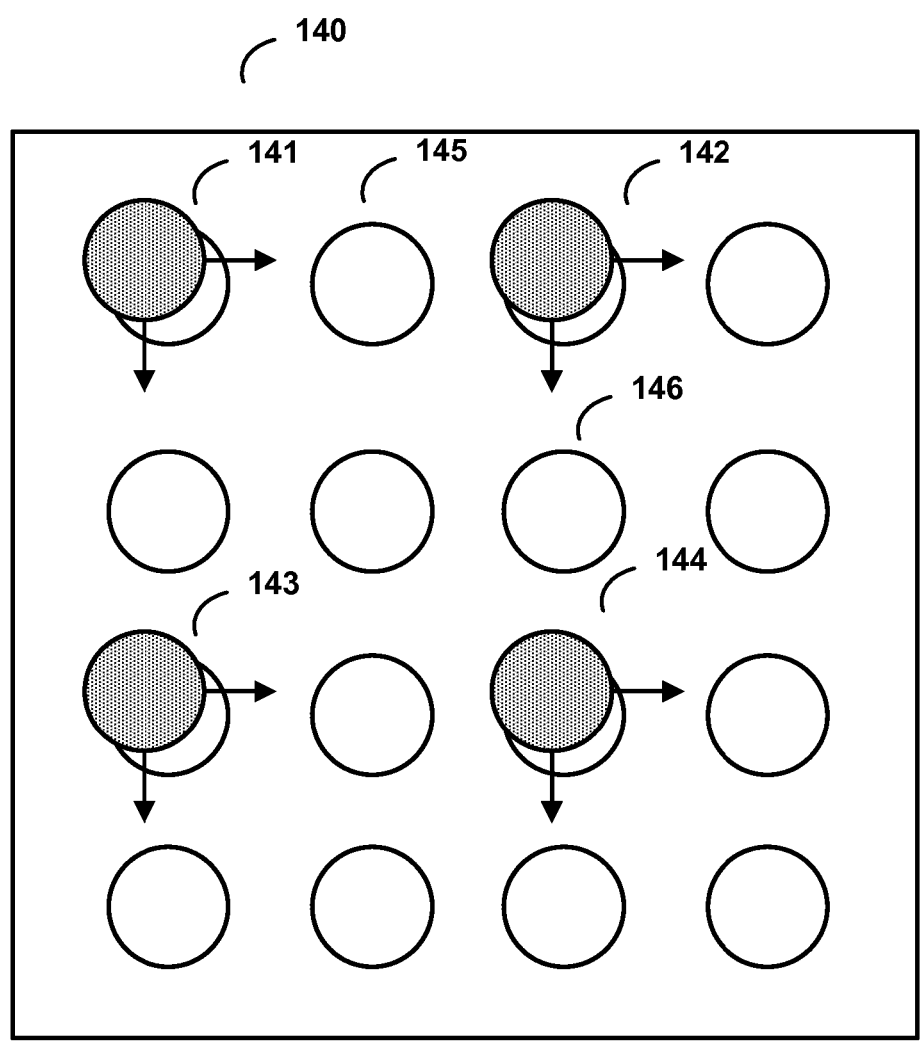
FIG. 3 is a conceptual diagram showing block-based classification for an adaptive loop filter.

For a block based classification mode, a frame is divided in to 4×4 blocks, and each 4×4 block derives one class by computing a metric using direction and activity information. For each class, one set of linear filter coefficients (a plurality of AC coefficients and one DC coefficient) can be used and one class can share the same filter coefficients with other classes. FIG. 3 is a conceptual diagram showing block-based classification for an adaptive loop filter.

The computation of the direction and activity, and the resulting metric based on direction and activity, are shown below:
Direction
   Ver_act(i,j)=abs(X(i,j)<<1−X(i,j−1)−X(i,j+1))
   Hor_act(i,j)=abs(X(i,j)<<1−X(i−1,j)−X(i+1,j))
   $H_B = \Sigma_{i=0,2} \Sigma_{j=0,2} H(i,j)$
   $V_B = \Sigma_{i=0,2} \Sigma_{j=0,2} V(i,j)$
   Direction=0, 1(H>2V), 2(V>2H)
Activity
   $L_B = H_B + V_B$
   5 classes (0, 1, 2, 3, 4)
Metric
   Activity+5*Direction Hor_act (i, j) generally refers to the horizontal activity of current pixel (i, j), and Vert_act(i, j) generally refers to the vertical activity of current pixel (i,j). X(i, j) generally refers to a pixel vale of pixel (i, j)), where i and j indicate horizontal and vertical coordinates of the current pixel. In this context, activity is generally the gradient or variance among pixels in a location.

$H_B$ refers to the horizontal activity of the 4×4 block, which in this example is determined based on a sum of horizontal activity for pixels (0, 0), (0, 2), (2, 0), and (2, 2). $V_B$ refers to the vertical activity of the 4×4 block, which in this example is determined based on a sum of vertical activity for pixels (0, 0), (0, 2), (2, 0), and (2, 2). "<<1" represents a multiply by two operation. Based on the values of $H_B$ and $V_B$, a direction can be determined. As one example, if the value of $H_B$ is more than 2 times the value of $V_B$, then the direction can be determined to be direction 1 (i.e. horizontal), which might correspond to more horizontal activity than vertical activity. If the value of $V_B$ is more than 2 times the value of $H_B$, then the direction can be determined to be direction 2 (i.e. vertical), which might correspond to more vertical activity than horizontal activity. Otherwise, the direction can be determined to be direction 0 (i.e. no direction), meaning neither horizontal nor vertical activity is dominant. The labels for the various directions and the ratios used to determine the directions merely constitute one example, as other labels and ratios can also be used.

Activity ($L_B$) for the 4×4 block can be determined as a sum of the horizontal and vertical activity. The value of $L_B$ can be classified into a range. This particular example shows five ranges, although more or fewer ranges may similarly be used. Based on the combination of activity and direction, a filter for the 4×4 block of pixels can be selected. As one example, a filter may be selected based on a two-dimensional mapping of activity and direction to filters, or activity and direction may be combined into a single metric, and that single metric may be used to select a filter (e.g., the metric=Activity+5*Direction).

Returning to FIG. 3, block 140 represents a 4×4 block of pixels. In this example, only four of the sixteen pixels are used to calculate activity and direction metrics for a block-based ALF. The four pixels are pixel (0, 0) which is labeled as pixel 141, pixel (2, 0) which is labeled as pixel 142, pixel (0, 2) which is labeled as pixel 143, and pixel (2, 2) which is labeled as pixel 144. The Horizontal activity of pixel 141 (i.e., hor_act(0, 0)), for example, is determined based on a left neighboring pixel and a right neighboring pixel. The right neighboring pixel is labeled as pixel 145. The left neighboring pixel is located in a different block than the 4×4 block and is not shown in FIG. 3. The vertical activity of pixel 142 (i.e. ver_act(2, 0)), for example, is determined based on an upper neighboring pixel and a lower neighboring pixel. The lower neighboring pixel is labeled as pixel 146, and the upper neighboring pixel is located in a different block than the 4×4 block and is not shown in FIG. 3. Horizontal and vertical activity may be calculated for pixels 143 and 144 in a similar manner.

In one proposal for the HEVC standard, the ALF is performed along with other loop filters (e.g., deblocking (DB) and SAO). Filters may be said to be performed "in loop" when the filters are applied by a video coding device to video data before outputting the video data as pixel data for display. In this manner, in-loop filtered video data may be used for reference by subsequently coded video data. Moreover, both a video encoder and a video decoder may be configured to perform substantially the same filtering process. The loop filters are processed in the following order: DB, SAO, ALF. In one WD of HEVC, each of the loop filters are frame-based. However, if any of the loop filters are applied at the slice level (including an entropy slice) or at the tile level, special loop filter handling may be beneficial at the slice and tile boundaries. An entropy slice is independently entropy coded, but uses dependent pixel processing (e.g., intra-prediction) between different slices.

Figure 4:
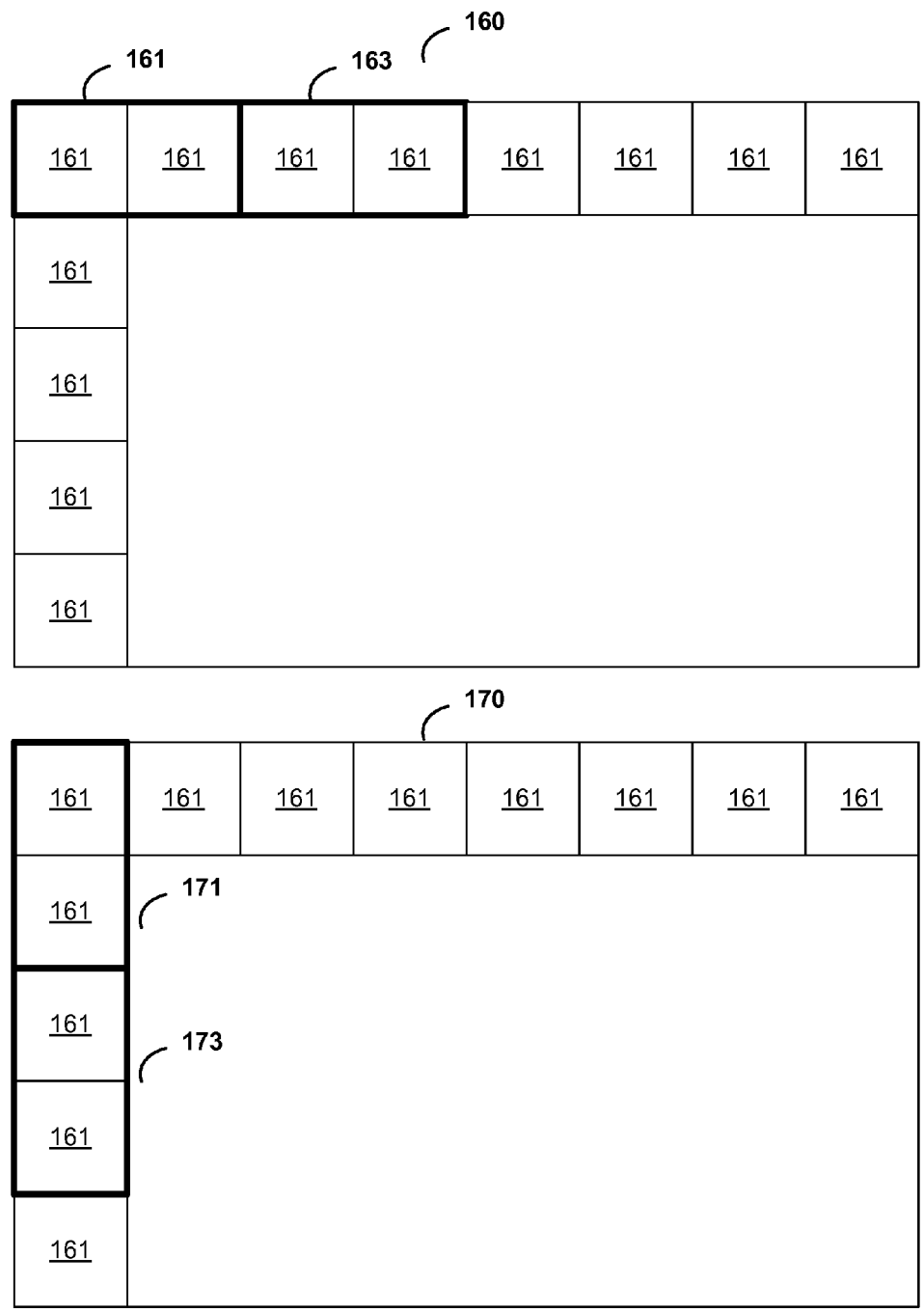
FIG. 4 is a conceptual diagram showing tiles of a frame.

FIG. 4 is a conceptual diagram showing example tiles of a frame. Frame 160 may be divided into multiple largest coding units (LCU) 162. Two or more LCUs may be grouped into a rectangular-shaped tiles. When tile-based coding is enabled, coding units within each tile are coded (i.e., encoded or decoded) together before coding subsequent tiles. As shown for frame 160, tiles 161 and 163 are oriented in a horizontal manner and have both horizontal and vertical boundaries. As shown for frame 170, tiles 161 and 163 are oriented in a vertical manner and have both horizontal and vertical boundaries.

Figure 5:
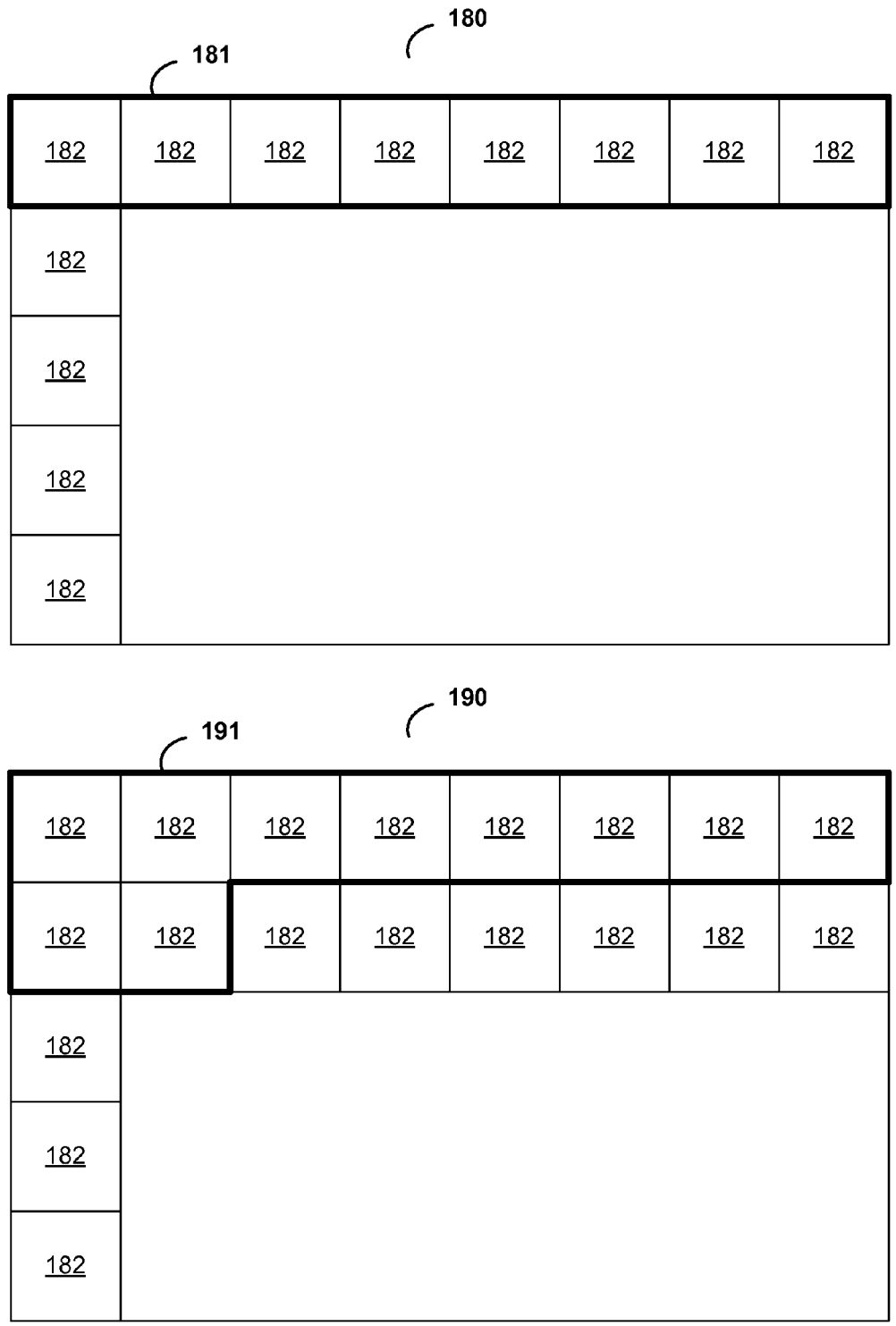
FIG. 5 is a conceptual diagram showing slices of a frame.

FIG. 5 is a conceptual diagram showing examples slices of a frame. Frame 180 may be divided into a slice which consists of multiple consecutive LCUs (182) in raster scan order across the frame. In some examples, a slice may have a uniform shape (e.g., slice 181) and encompass one or more complete rows of LCUs in a frame. In other examples, a slice is defined as a specific number of consecutive LCUs in raster scan order, and may exhibit a non-uniform shape. For example, frame 190 is divided into a slice 191 that consists of 10 consecutive LCUs (182) in raster scan order. As frame 190 is only 8 LCUs wide, an additional two LCUs in the next row are included in slice 191.

It should be noted that in some instances, slice and tile boundaries may be coincident (i.e., they directly overlap). The techniques of this disclosure apply in situations slice and tile boundary are coincident, as well as in situations where slice and tile boundaries are not coincident.

Figure 6:
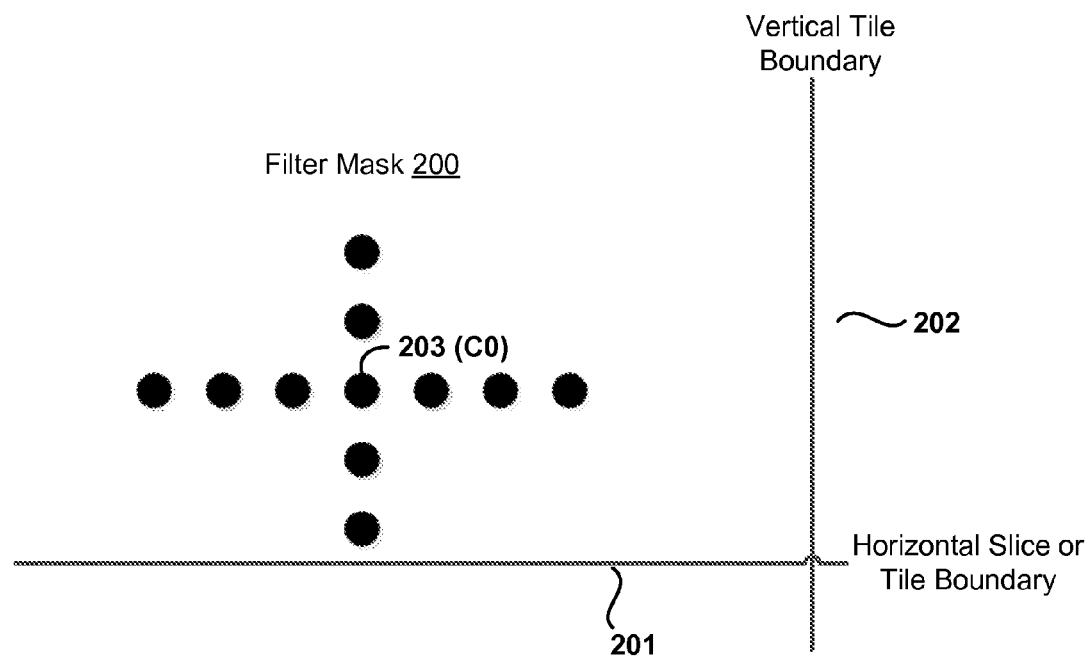
FIG. 6 is conceptual diagram depicting an loop filter at slice and tile boundaries.

FIG. 6 is conceptual diagram depicting a loop filter at slice and tile boundaries. Horizontal slice and/or tile boundary 201 is depicted as a horizontal line and vertical tile boundary 202 is depicted as a vertical line. The filled circles (i.e., dots) of filter mask 200 in FIG. 3 represent coefficients (i.e., weights) of the filter, which are applied to pixels of the reconstructed video block in the slice and/or tile. That is, the value of a coefficient of the filter may be applied to the value of a corresponding pixel, such that the value of the corresponding is multiplied by the coefficient value to produce a weighted pixel value. The pixel value may include a luminance value and one or more chrominance values. Assuming that the center of the filter is positioned at the position of (or in close proximity to) the pixel to be filtered, a filter coefficient may be said to correspond to a pixel that is collocated with the position of the coefficient. Pixels corresponding to coefficients of a filter can also be referred to as "supporting pixels" or collectively, as a "set of support" for the filter. The filtered value of a current pixel 203 (corresponding to the center pixel mask coefficient C0) is calculated my multiplying each coefficient in filter mask 200 by the value of its corresponding pixel, and summing each resulting value.

In this disclosure, the term "filter" generally refers to a set of filter coefficients. For example, a 3×3 filter may be defined by a set of 9 filter coefficients, a 5×5 filter may be defined by a set of 25 filter coefficients, a 9×5 filter may be defined by a set of 45 filter coefficients, and so on. Filter mask 200 shown in FIG. 6 is a 7×5 filter having 7 filter coefficients in the horizontal direction and 5 filter coefficients in the vertical direction (the center filter coefficient counting for each direction), however any number of filter coefficients may be applicable for the techniques of this disclosure. The term "set of filters" generally refers to a group of more than one filter. For example, a set of two 3×3 filters, could include a first set of 9 filter coefficients and a second set of 9 filter coefficients. The term "shape," sometimes called the "filter support," generally refers to the number of rows of filter coefficients and number of columns of filter coefficients for a particular filter. For example, 9×9 is an example of a first shape, 7×5 is an example of a second shape, and 5×9 is an example of a third shape. In some instances, filters may take non-rectangular shapes including diamond-shapes, diamond-like shapes, circular shapes, circular-like shapes, hexagonal shapes, octagonal shapes, cross shapes, X-shapes, T-shapes, other geometric shapes, or numerous other shapes or configuration. The example in FIG. 6 is a cross shape, however other shape may be used. In most common cases, regardless of the shape of the filter, the center pixel in the central pixel in the filter mask is the one that is being filtered. In other examples, the filter pixel is offset from the center of the filter mask.

In some video coding techniques, loop filtering (e.g., deblocking, ALF, and SAO) is disabled across slices and/or tile boundaries. This is because pixels in neighboring slices and/or tiles may not have already been coded, and as such, would be unavailable for use with some filter masks. In these cases, padded data is used for unavailable pixels (i.e., pixels that are on the other side of the slice or tile boundary from the current slice or tile) and filtering is not performed. The use of such padded data may decrease the visual quality of the image around slice and/or tile boundaries.

In view of the drawback, this disclosure proposes techniques for performing loop filtering along slice and tile boundaries. The techniques of this disclosure may be used with any type of loop filter used in video coding, such as ALF, deblocking, and SAO filters. In general, this disclosure proposes using partial filters around slice and tile boundaries. A partial filter is a filter that does not use one or more filter coefficients that are typically used for the filtering process. In one example, this disclosure proposes using partial filters where at least the filter coefficients corresponding to pixels on the other side of slice and/or tile boundary are not used. Hence, in some examples, there is no need to provide padded data for the pixels on the other side of the slice and/or tile boundary. Rather, a partial filter can be configured to omit the pixels on the other side of the slice and/or tile boundary.

Figure 7:
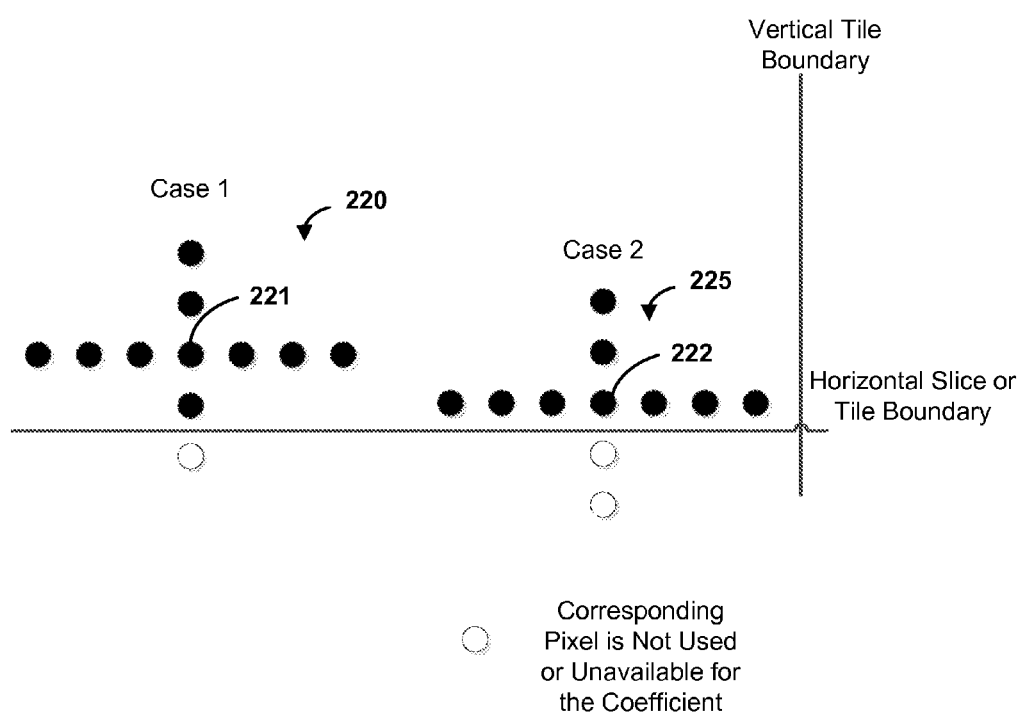
FIG. 7 is conceptual diagram depicting asymmetric partial filters at a horizontal boundary.
Figure 8:
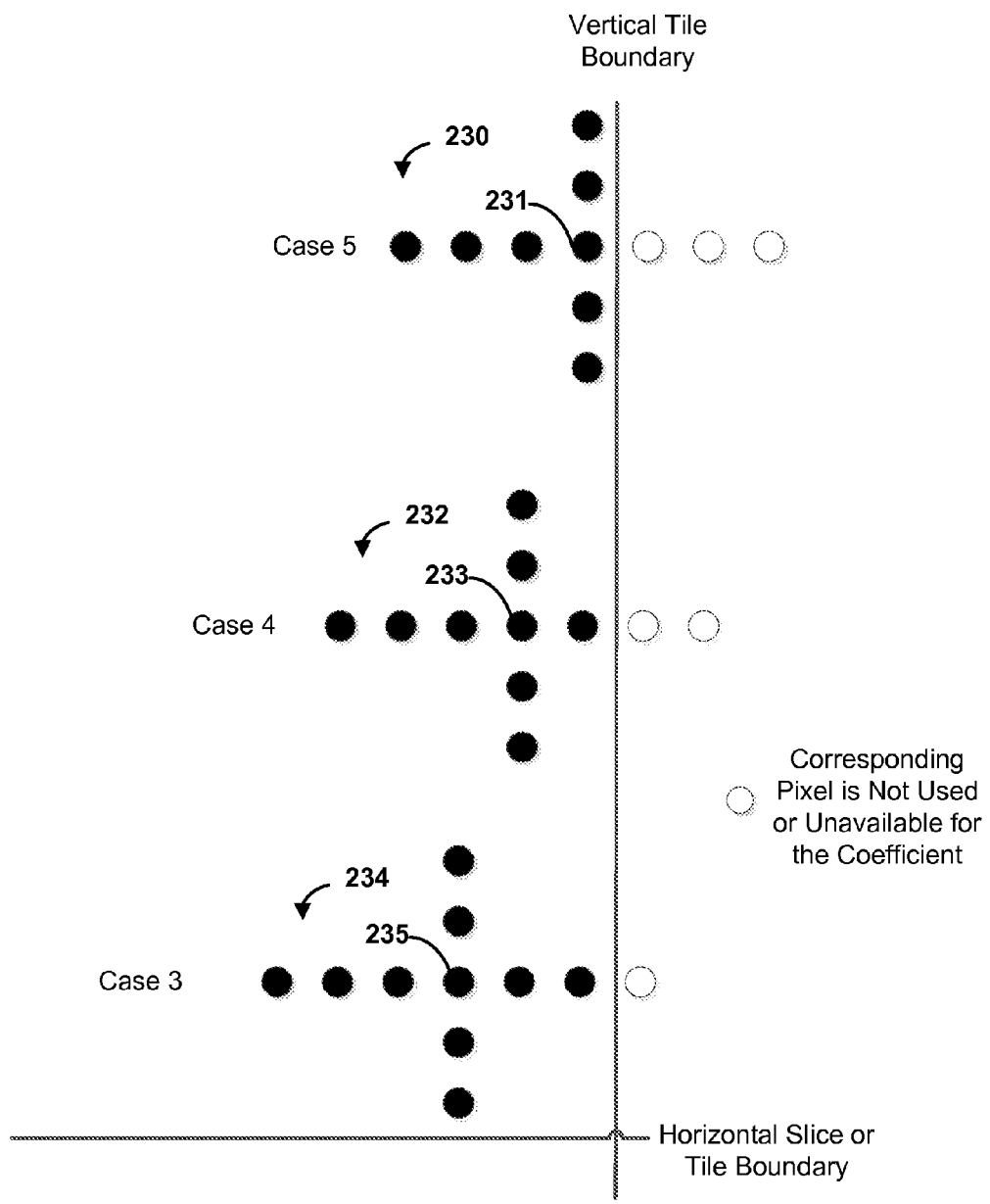
FIG. 8 is conceptual diagram depicting asymmetric partial filters at a vertical boundary.

In one example, asymmetric partial filters are used near slice and tile boundaries. FIG. 7 is conceptual diagram depicting asymmetric partial filters at a horizontal boundary. FIG. 8 is conceptual diagram depicting asymmetric partial filters at a vertical boundary. In this approach, as shown in FIGS. 7 and 8, only available pixels (i.e., pixels within the current slice and/or tile) are used for filtering. Filter taps outside the tile or slice boundary are skipped. As such, no padded pixel data is used. The filters in FIG. 7 and FIG. 8 are referred to as asymmetric because there are more filter taps used on one side (either the horizontal or vertical side) of the center of the filter mask then the other. As the entire filter mask is not used, the filter coefficients may be renormalized to produce the desired results. Techniques for renormalization will be discussed in more detail below.

In Case 1 of FIG. 7, the center 221 of filter mask 220 is one row of pixels away from a horizontal slice or tile boundary. Since filter mask 220 is a 7×5 filter, one filter coefficient in the vertical direction corresponds to a pixel that is over the horizontal boundary. This filter coefficient is depicted in white, i.e., as an unfilled circle. The pixel corresponding to the white filter coefficient is unavailable for use in filtering, as it has not yet been coded (e.g., encoded or decoded). As such, the filter coefficient corresponding to that pixel is not used. Likewise, in Case 2, the center 222 of filter mask 225 is on a row of pixels adjacent the horizontal slice and/or tile boundary. In this case, two filter coefficients correspond to pixels that are over the horizontal boundary. As such, neither of the two white filter coefficients in filter mask 225 is used for loop filtering. In both Case 1 and Case 2, all black (i.e., filled circle) filter coefficients are used. It should be noted that filter pixels values in accordance with this disclosure may include filtering luminance components of the pixel value, filtering chrominance components of the pixel value, or filtering both luminance and chrominance components of the pixel value.

In case 3 of FIG. 8, the center 235 of filter mask 234 is two columns of pixels away from a vertical tile boundary. Since filter mask 234 is a 7×5 filter, one filter coefficient in the horizontal direction corresponds to a pixel that is over the vertical boundary. Again, this filter coefficient is depicted in white. The pixel corresponding to the white filter coefficient is unavailable for use in filtering, as it has not yet been coded (e.g., encoded or decoded). As such, the filter coefficient corresponding to that pixel is not used. Similarly, in Case 4, the center 233 of filter mask 232 is one column of pixels away from a vertical tile boundary. In this case, two filter coefficients correspond to pixels that over the vertical boundary. As such, neither of the two white filter coefficients in filter mask 232 is used for loop filtering. In Case 5, the center 231 of filter mask 230 is on a column of pixels adjacent the vertical tile boundary. In this case, three filter coefficients correspond to pixels that are over the vertical boundary. As such, none of the three white filter coefficients in filter makes 230 are used for loop filtering. In all of Case 1, 2 or 3, all black filter coefficients are used.

Figure 9:
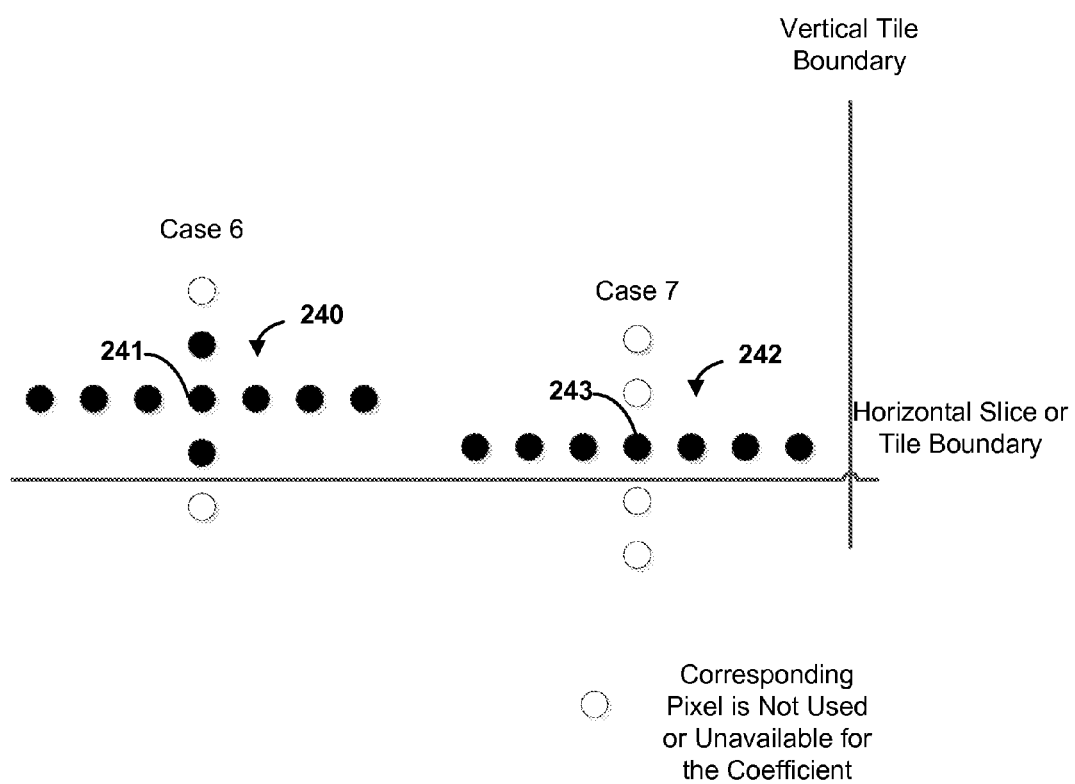
FIG. 9 is conceptual diagram depicting symmetric partial filters at a horizontal boundary.
Figure 10:
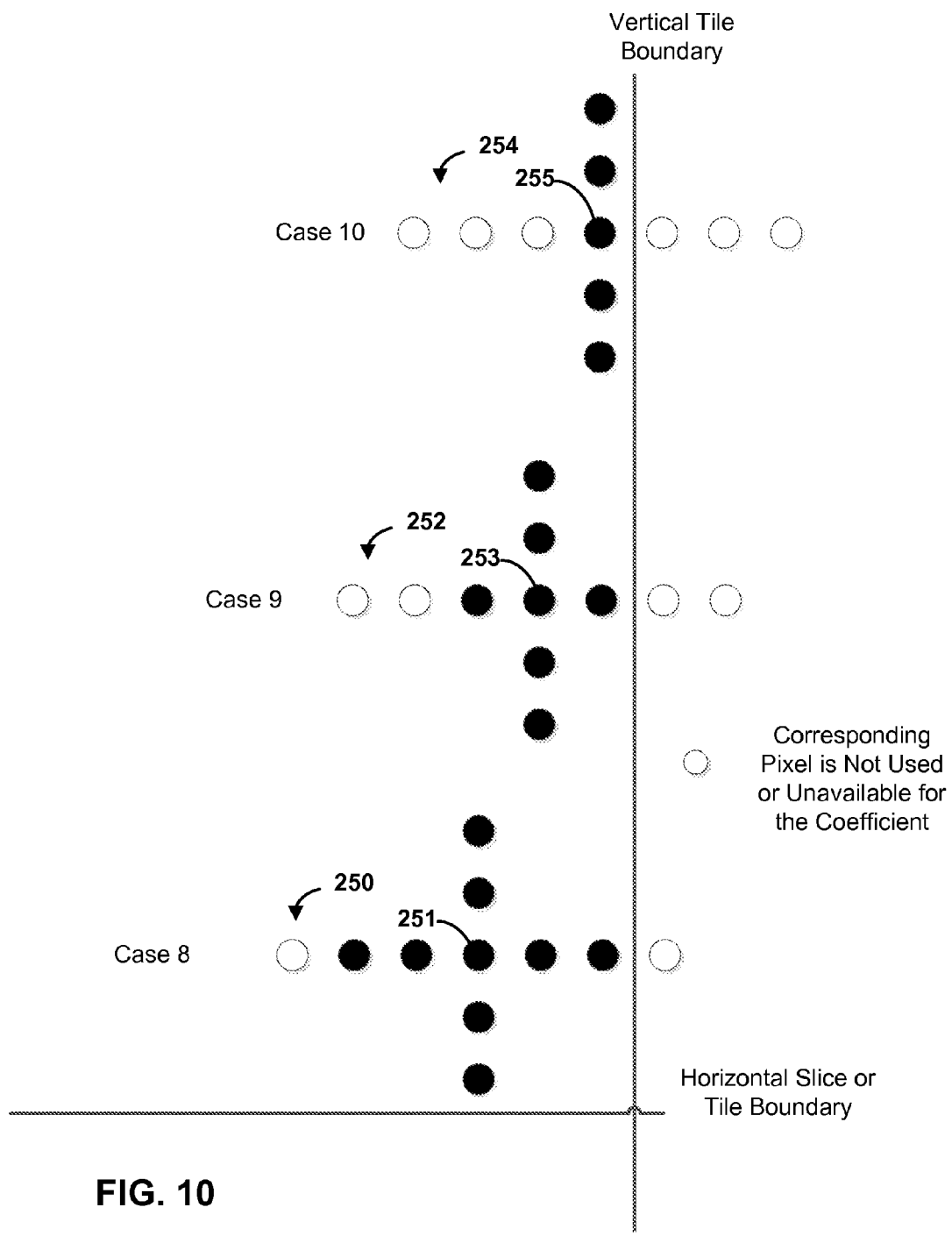
FIG. 10 is conceptual diagram depicting symmetric partial filters at a vertical boundary.

In another example, symmetric partial filters are used near slice and tile boundaries. FIG. 9 is conceptual diagram depicting symmetric partial filters at a horizontal boundary. FIG. 10 is conceptual diagram depicting symmetric partial filters at a vertical boundary. As with asymmetric partial filters, in this approach, only available pixels are used for filtering. That is, the filter taps outside the tile or slice boundary are skipped. As such, no padded pixel data is used. Also, some coefficients of the filter mask that are within the current slice or tile are also not used, so as to retain a symmetrical filter mask.

For example, in Case 6 of FIG. 9, one filter coefficient in filter mask 240 is outside the horizontal slice or tile boundary. The corresponding filter coefficient within the horizontal boundary on the other side of the filter mask is also not used. In this way, a symmetrical arrangement of coefficients in the vertical direction around the center coefficient 241 is preserved. In Case 7 of FIG. 9, two filter coefficients in filter mask 242 are across the horizontal boundary. The corresponding two filter coefficients on the other side of the center filter coefficient 243 within the horizontal boundary are also not used. Similar examples are shown in FIG. 10 for the vertical tile boundary. In case 8, one filter coefficient corresponds to a pixel across the vertical tile boundary. This coefficient is not used, as well as another pixel at the left side of the horizontal part of filter mask 250 to maintain symmetry around center coefficient 251. Similar filter mask adjustments are made for filter masks 252 and 254 in the case where two (Case 9) and four (Case 10) filter coefficients correspond to pixel across the vertical boundary. Shown in Cases 9 and 10, symmetry is maintained around center coefficients 253 and 255, respectively.

Like the asymmetric partial filters shown in FIG. 7 and FIG. 8, the entire filter mask is not used for the symmetric partial filters. Accordingly, the filter coefficients may be renormalized. Techniques for renormalization will be discussed in more detail below.

To reiterate, for each of the filter masks shown in FIGS. 6-10, a filtered value for the pixel corresponding to the center of the filter mask is calculated by multiplying a filter coefficient (represented by a darkened circle in the mask) to an associate pixel value, and then adding the multiplied values together.

Whether or not to apply a partial filter (e.g., asymmetric partial filter or symmetric partial filter) can be an adaptive decision. For the examples shown in FIG. 7 and FIG. 9, a partial filter may be used for Case 1 and Case 6, but not for Case 2 and Case 7. It may not be preferable to use partial filters for Case 2 and Case 7 because the number of unused filter coefficients is larger. Instead, other techniques described below (e.g., mirror padding, skipping filtering, etc.) can be used for Case 2 and Case 7. Likewise, for the examples shown in FIG. 8 and FIG. 10, the use of partial filtering may be applicable for Cases 3, 4, 8, and 9, but not for Cases 5 and 10.

The decision made by a coder, i.e., an encoder or decoder, to use a partial filter can also be based on other criteria. For example, a partial filter may not be used when the number of coefficients whose corresponding pixels are not available is greater than some threshold. A partial filter may not be used when the sum of the coefficient values whose corresponding pixels are not available is greater than some threshold. As another example, a partial filter may not be used when the sum of the absolute values of the coefficient values whose corresponding pixels are not available is greater than some threshold.

Number of coefficients whose corresponding pixels are not available>Th1

Sum (coefficients whose corresponding pixels are not available)>Th2

Sum (abs(coefficients whose corresponding pixels are not available))>Th3.

A subset of the above conditions can be chosen to decide whether to apply a partial filter for specific slice of tile boundaries. In the above conditions, a corresponding pixel is a pixel with a pixel value to which a particular coefficient is to be applied to weight the pixel value, e.g., as part of the weighted summation of pixel values to produce the filtered pixel value of the current pixel.

In another example of the disclosure, partial filtering may only be enabled for horizontal slice and tile boundaries. At vertical boundaries, however, loop filtering may be skipped entirely. More specifically, in one example, if a video coder determines that a loop filter mask will use pixels on the other side of a vertical tile boundary, loop filtering will be skipped for that pixel. In other example, if a video coder determines that an loop filter mask will use pixels on the other side of a vertical tile boundary for one or more pixels in a coding unit, loop filtering will be skipped for the entire coding unit.

In other examples of the disclosure, additional techniques may be applied at slice and tile boundaries when partial filtering is not used. In one example, the loop filtering technique may use mirrored padded pixels on the other side of a slice or tile boundary, rather than using repetitively padded pixels. Mirrored pixels reflect the pixel values on the inside of the slice or tile boundary. For example, if the unavailable pixel is adjacent the tile or slice boundary, i.e., outside of the tile or slice boundary, it would take the value (i.e., mirror) of the pixel on the inside of the tile or slice boundary that is also adjacent the boundary. Likewise, if the unavailable pixel is one row or column away from the tile or slice boundary, it would take the value (i.e., mirror) of the pixel on the inside of the tile or slice boundary that is also one row or column away from the boundary, and so forth.

In another example, the filtered values for pixels on the other side of a tile or slice boundary may be calculated according to the following equation: a*loop filter using padded data a+b*pre-filtered output where a+b=1. That is, padded pixels (i.e., pixels added to the other side of the slice or tile boundary) are multiplied by the loop filter coefficient corresponding to the padded pixel and by a constant "a." This value is then added to the multiplication of the pre-filtered padded pixel value and a constant "b," where a+b=1. The values a and b are predefined values based on training, and are typically 0.5 and 0.5.

Renormalization of filter coefficients for symmetric and asymmetric partial filter can be achieved in different ways. In general, the renormalization process recalculates the value of the remaining filter coefficients in a partial filter mask, such that the total value of the remaining filter coefficients equals the total value of the original filter coefficients. Often, this total value is 1. Consider an example where the original filter coefficients are labeled as $C\_1, \ldots, C\_N$, where C is the value of a particular coefficient. Now assume that the $C\_1, \ldots, C\_M$ coefficients do not have available corresponding pixels (i.e., the corresponding pixels are across a slice or tile boundary). Renormalized filter coefficients can be defined as follows:

Example 1

Coeff_all=$C\_1+C\_2+\ldots+C\_N$

Coeff_part=Coeff_all−($C\_1+\ldots+C\_M$)

New_coeffs $C\_i'=C\_i$*Coeff_all/Coeff_part,$i=M+1,\ldots,N$

In example 1, Coeff_all represents the value of all coefficients in a filter mask summed together. Coeff_part represents the value of all coefficients in a partial filter mask. That is, the summed value of the coefficients corresponding to unavailable pixels ($C\_1+\ldots+C\_M$) are subtracted from the sum of all possible coefficients in the filter mask (Coeff_all). New_coeffs_Ci' represents the value of the filter coefficients in the partial coefficients after a renormalization process. In Example 1 above, the value of the coefficient remaining in the partial filter is multiplied the total value of all possible coefficients in the filter mask (Coeff_all) and divided by the total value of all coefficients in the partial filter mask (Coeff_part).

Example 2 below shows another technique for renormalizing filter coefficients in a partial filter.

Example 2

For subset of $C\_i$, $i=M+1,\ldots,N$, add $C\_k$, $k=1,\ldots,M$
For example, $C\_(M+1)'=C\_(M+1)+C\_1, C\_(M+2)'=C\_(M+2)+C\_3, \ldots$ or   a.

$C\_L'=C\_L+(C\_1+C\_2+\ldots+C\_M)$   b.

In this example, filter coefficients are renormalized by adding the coefficients of skipped filter taps ($C\_k$) to the coefficients of non-skipped filter taps ($C\_i$).

Figure 11:
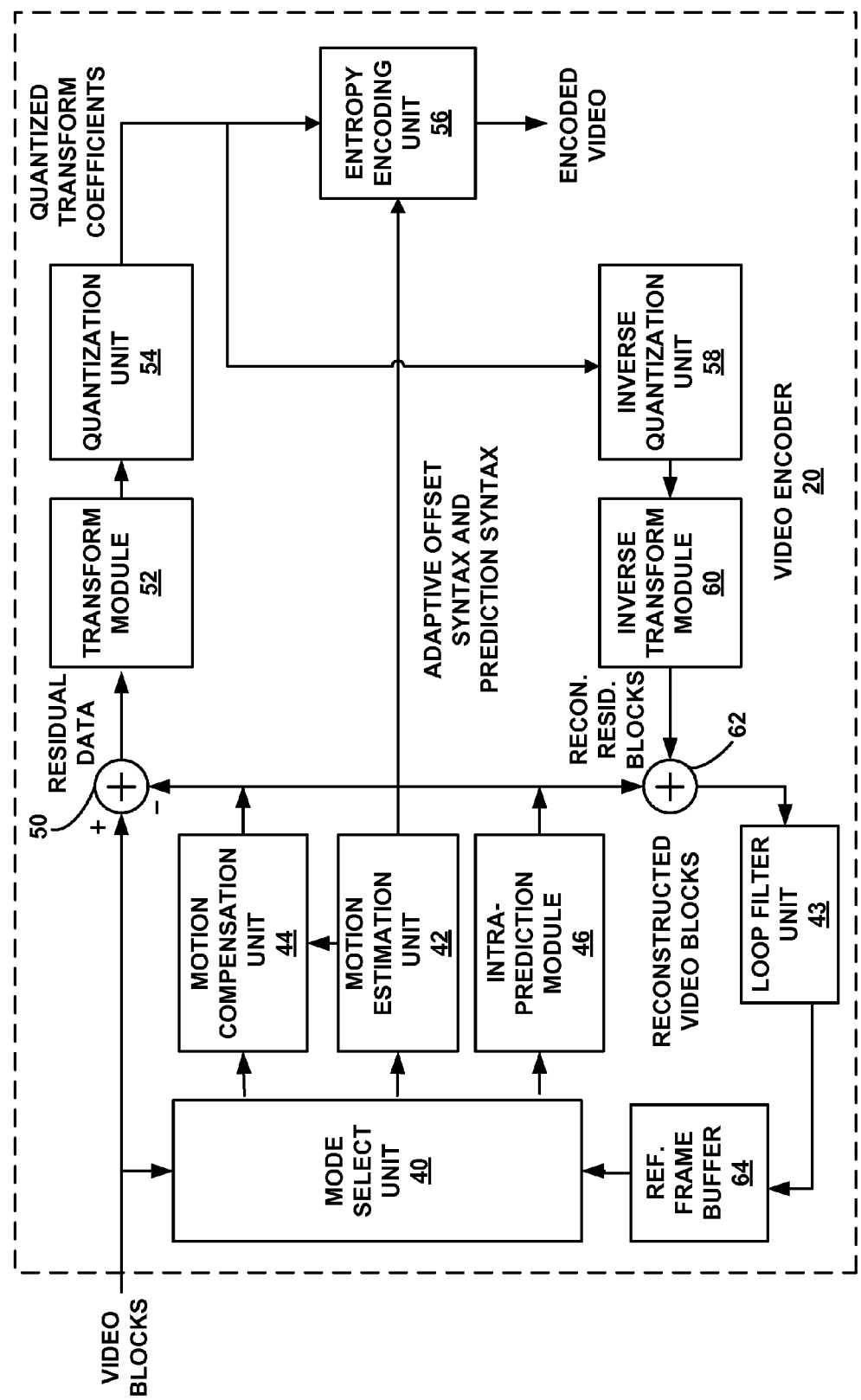
FIG. 11 is a block diagram illustrating an example video encoder.

FIG. 11 is a block diagram illustrating an example of a video encoder 20 that may use techniques for loop filtering in a video coding process as described in this disclosure. The video encoder 20 will be described in the context of HEVC coding for purposes of illustration, but without limitation of this disclosure as to other coding standards or methods that may require loop filtering. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 11, the video encoder 20 receives a current video block within a video frame to be encoded. In the example of FIG. 11, the video encoder 20 includes a motion compensation unit 44, a motion estimation unit 42, an intra-prediction module 46, a reference frame buffer 64, a summer 50, a transform module 52, a quantization unit 54, and an entropy encoding unit 56. The transform module 52 illustrated in FIG. 11 is the unit that applies the actual transform or combinations of transform to a block of residual data, and is not to be confused with block of transform coefficients, which also may be referred to as a transform unit (TU) of a CU. For video block reconstruction, the video encoder 20 also includes an inverse quantization unit 58, an inverse transform module 60, a summer 62, and a loop filter unit 43. Loop filter unit 43 may comprise one or more of a deblocking filter unit, an SAO filter unit, and an ALF filter unit.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction module 46 may perform intra-predictive coding of the received video block relative to one or more neighboring blocks in the same frame or slice as the block to be coded to provide spatial compression.

The mode select unit 40 may select one of the coding modes, intra or inter, e.g., based on rate distortion results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform module 60 for the block to reconstruct the encoded block, as described in greater detail below. Some video frames may be designated as I-frames, where all blocks in an I-frame are encoded in an intra-prediction mode. In some cases, the intra-prediction module 46 may perform intra-prediction encoding of a block in a P- or B-frame, e.g., when motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction module 46 may intra-predict the received block, as an alternative to inter-prediction performed by the motion estimation unit 42 and the motion compensation unit 44. The intra-prediction module 46 may predict the received block relative to neighboring, previously coded blocks, e.g., blocks above, above and to the right, above and to the left, or to the left of the current block, assuming a left-to-right, top-to-bottom encoding order for blocks. The intra-prediction module 46 may be configured with a variety of different intra-prediction modes. For example, the intra-prediction module 46 may be configured with a certain number of directional prediction modes, e.g., thirty-five directional prediction modes, based on the size of the CU being encoded.

The intra-prediction module 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction module 46 may calculate an error value for the prediction mode based on pixel differences between the PU and the received block to be encoded. The intra-prediction module 46 may continue testing intra-prediction modes until an intra-prediction mode that yields an acceptable error value is discovered. The intra-prediction module 46 may then send the PU to the summer 50.

The video encoder 20 forms a residual block by subtracting the prediction data calculated by the motion compensation unit 44 or the intra-prediction module 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform module 52 may form one or more transform units (TUs) from the residual block. The transform module 52 selects a transform from among a plurality of transforms. The transform may be selected based on one or more coding characteristics, such as block size, coding mode, or the like. The transform module 52 then applies the selected transform to the TU, producing a video block comprising a two-dimensional array of transform coefficients. The transform module 52 may signal the selected transform partition in the encoded video bitstream.

The transform module 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CAVLC, CABAC, syntax-based context-adaptive binary arithmetic coding (SBAC), or another entropy coding methodology to the coefficients.

To perform CAVLC, the entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform module 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block.

The loop filter unit 43 may then perform loop filtering on the reconstructed blocks in accordance with the techniques described above. In examples of the disclosure, loop filter unit 43, alone or together with other components of video encoder 20, may be configured to perform loop filtering in a video coding process. For example, loop filter unit 43 may be configured to determine, for a current pixel of a reconstructed block, that one or more pixels corresponding to filter coefficients of a filter mask for an loop filter are across one of a slice or a tile boundary, and to perform loop filtering on the current pixel using a partial loop filter (e.g., a symmetrical or asymmetrical partial loop filter according to examples of this disclosure).

In one example, loop filter unit 43 may be further configured to remove the filter coefficients corresponding to the one or more pixels across the slice or tile boundary from the filter mask, and to create a partial filter mask for the partial loop filter using the remaining filter coefficients in the filter mask. Loop filter unit 43 may also renormalize the partial filter mask, wherein performing loop filtering comprises performing loop filtering on the current pixel using the partial loop filter with the renormalized partial filter mask.

In another example, loop filter unit 43 may be further configured to remove first filter coefficients corresponding to the one or more pixels across the slice or tile boundary from the filter mask, to remove second filter coefficients corresponding to pixels on the inside of the slice and tile boundary in order to maintain a symmetrical filter mask relative to the removed first filter coefficients, and to create a partial filter mask for the partial loop filter using the remaining filter coefficients in the filter mask.

After filtering the pixels, using the loop filtering techniques described in this disclosure, the filtered reconstructed video block is then stored in the reference frame buffer 64. The reconstructed video block may be used by the motion estimation unit 42 and the motion compensation unit 44 as a reference block to inter-code a block in a subsequent video frame. In this manner, loop filter unit 43 represents an example of a filtering unit that performs in-loop filtering of video data in accordance with the techniques of this disclosure, e.g., as described with respect to FIGS. 6-10.

Figure 12:
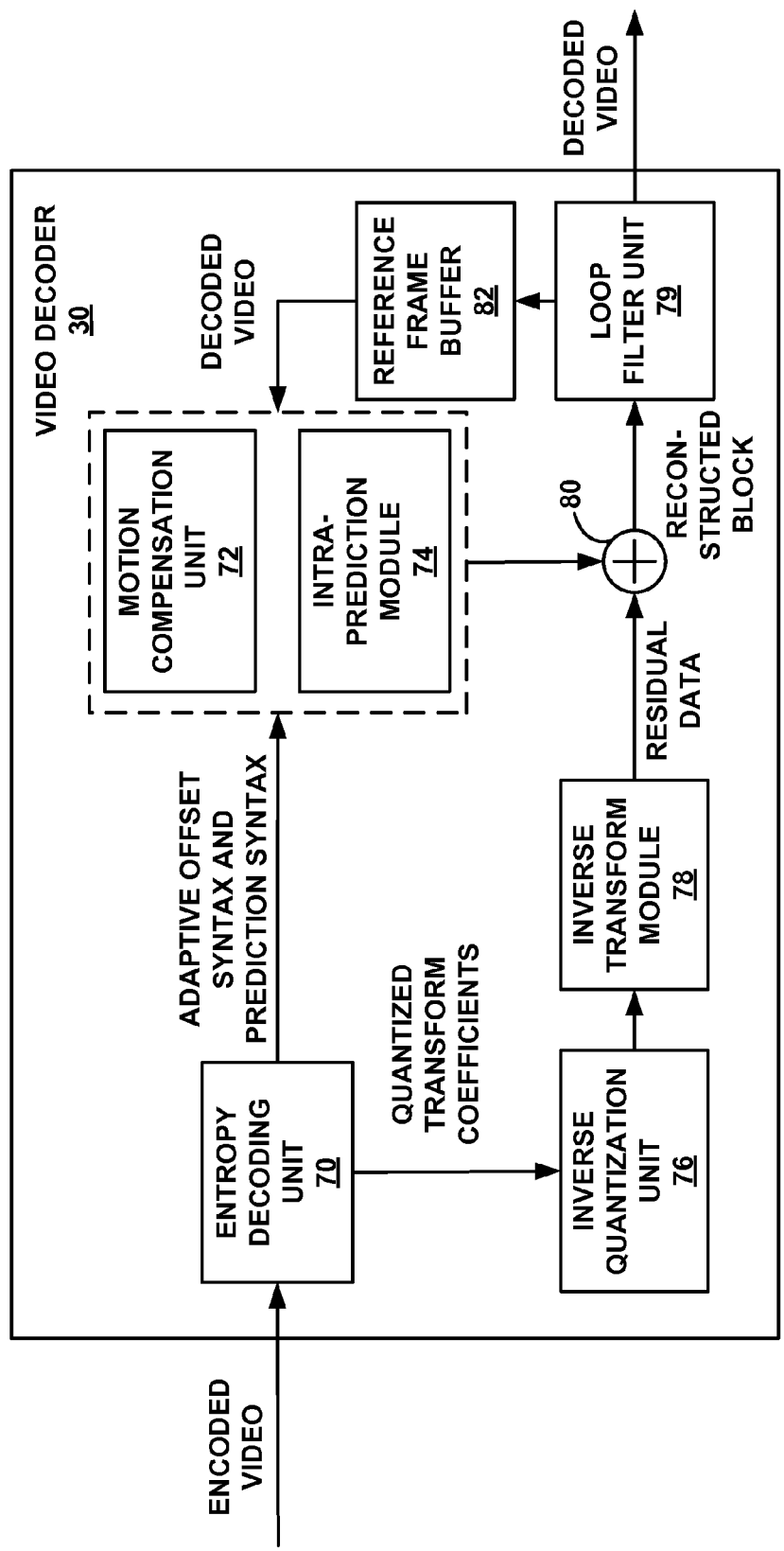
FIG. 12 is a block diagram illustrating an example video decoder.

FIG. 12 is a block diagram illustrating an example of a video decoder 30, which decodes an encoded video sequence. In the example of FIG. 12, the video decoder 30 includes an entropy decoding unit 70, a motion compensation unit 72, an intra-prediction module 74, an inverse quantization unit 76, an inverse transformation unit 78, a reference frame buffer 82, a loop filter unit 79, and a summer 80. The video decoder 30 may, in some examples, perform a decoding pass generally reciprocal to the encoding pass described with respect to the video encoder 20 (see FIG. 11).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform module 78 applies an inverse transform to the inverse quantized transform coefficients. In some examples, the inverse transform module 78 may determine an inverse transform based on signaling from the video encoder 20, or by inferring the transform from one or more coding characteristics such as block size, coding mode, or the like. In some examples, the inverse transform module 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform module 78 may apply a cascaded inverse transform, in which inverse transform module 78 applies two or more inverse transforms to the transform coefficients of the current block being decoded.

The intra-prediction module 74 may generate prediction data for a current block of a current frame based on a signaled intra-prediction mode and data from previously decoded blocks of the current frame.

Based on the retrieved motion prediction direction, reference frame index, and calculated current motion vector, the motion compensation unit produces a motion compensated block for the current portion. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction module 74, in an HEVC example, may use some of the syntax information (e.g., provided by a quadtree) to determine sizes of LCUs used to encode frame(s) of the encoded video sequence. The motion compensation unit 72 and the intra-prediction module 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction module 74 to form decoded blocks. The loop filter unit 79 then performs loop filtering in accordance with the techniques described above.

In examples of the disclosure, loop filter unit 79, alone or together with other components of video decoder 30, may be configured to perform loop filtering in a video coding process. Loop filtering may include one or more of deblocking, ALF, and SAO filtering. For example, loop filter unit 79 may be configured to determine, for a current pixel, that one or more pixels corresponding to filter coefficients of a filter mask for an loop filter are across one of a slice or a tile boundary, and to perform loop filtering on the current pixel using a partial loop filter.

In one example, loop filter unit 79 may be further configured to remove the filter coefficients corresponding to the one or more pixels across the slice or tile boundary from the filter mask, and to create a partial filter mask for the partial loop filter using the remaining filter coefficients in the filter mask. Loop filter unit 79 may also renormalize the partial filter mask, wherein performing loop filtering comprises performing loop filtering on the current pixel using the partial loop filter with the renormalized partial filter mask.

In another example, loop filter unit 79 may be further configured to remove first filter coefficients corresponding to the one or more pixels across the slice or tile boundary from the filter mask, to remove second filter coefficients corresponding to pixels on the inside of the slice and tile boundary in order to maintain a symmetrical filter mask relative to the removed first filter coefficients, and to create a partial filter mask for the partial loop filter using the remaining filter coefficients in the filter mask.

The decoded video blocks are then stored in the reference frame buffer 82, which provides reference blocks for subsequent motion compensation for inter-predictive coding and also produces decoded video for presentation on a display device (such as the display device 32 of FIG. 1). In this manner, loop filter unit 79 represents an example of a filtering unit that performs in-loop filtering of video data in accordance with the techniques of this disclosure, e.g., as described with respect to FIGS. 6-10.

Figure 13:
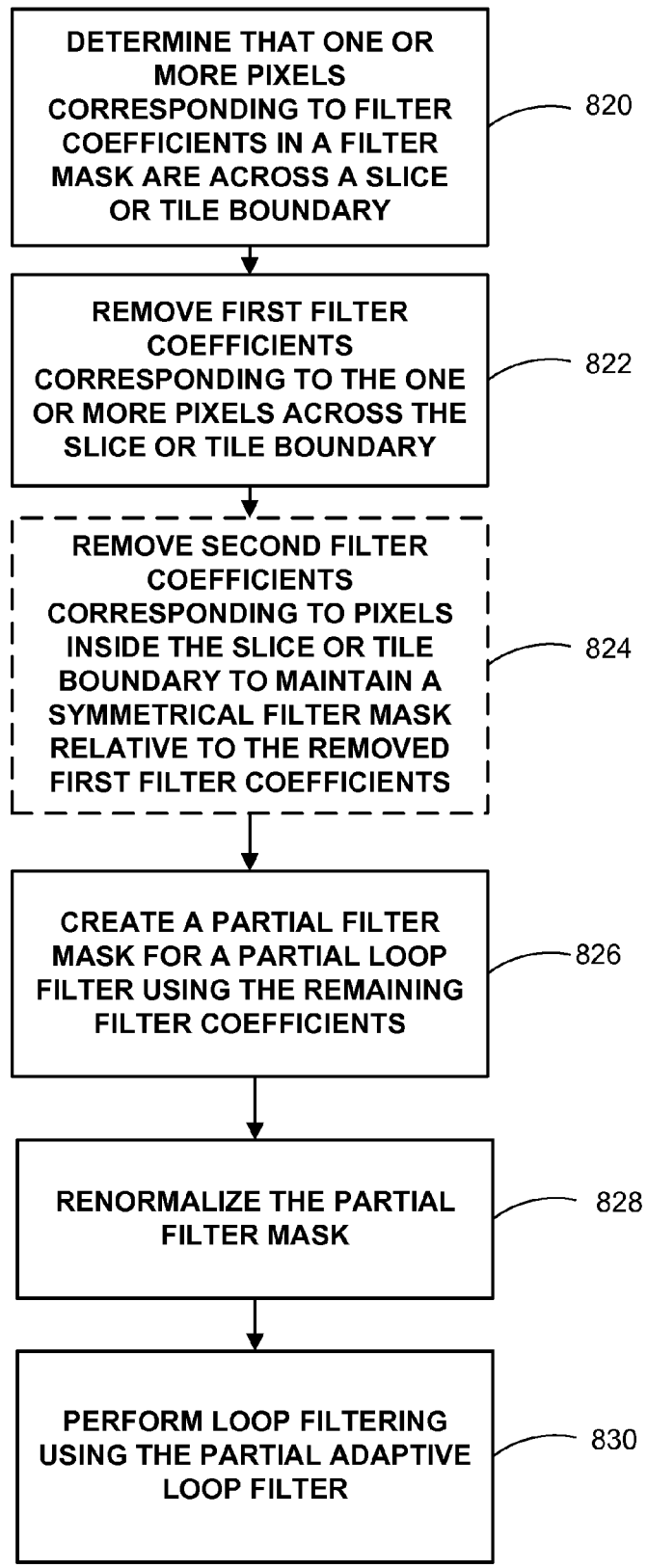
FIG. 13 flowchart depicting an example method of loop filtering according to the disclosure.

FIG. 13 is a flowchart depicting an example method of loop filtering according to the disclosure. The techniques shown in FIG. 13 may be implemented by either video encoder 20 or video decoder 30 (generally by a video coder). A video coder may be configured to determine, for a current pixel, that one or more pixels corresponding to filter coefficients of a filter mask for a loop filter are across one of a slice or a tile boundary (820). The video coder may be further configured to remove first filter coefficients corresponding to the one or more pixels across the slice or tile boundary from the filter mask (822). In this case, an asymmetric partial filter is formed. Optionally, the video coder may be further configured to remove second filter coefficients corresponding to pixels on the inside of the slice and tile boundary in order to maintain a symmetrical filter mask relative to the removed first filter coefficients (824).

The video coder may be further configured to create a partial filter mask for the partial loop filter using the remaining filter coefficients in the filter mask (826) and to renormalize the partial filter mask (828). Renormalizing the filter coefficients may include recalculating the value of the remaining filter coefficients in the partial filter mask such that the total value of the remaining filter coefficients equals the total value of filter coefficients in a full filter mask. Often, this total value is 1. The video coder then performs loop filtering on the current pixel using a partial loop filter with the renormalized partial filter mask (830).

In some examples, the video coder may be further configured to determine, for the current pixel, that one or more pixels corresponding to filter coefficients of the filter mask for the loop filter are across a vertical tile boundary, and to skip performing loop filtering for the current pixel.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for performing adaptive loop filtering in a video coding process, the method comprising:
   receiving filter coefficients of a filter mask for an adaptive loop filter;
   determining, for a first pixel, that all pixels corresponding to filter coefficients of the filter mask are within a boundary;
   based on the determination that all pixels corresponding to the filter coefficients of the filter mask are within the boundary, performing adaptive loop filtering on the first pixel using all the filter coefficients of the filter mask;
   determining, for a second pixel, that one or more pixels corresponding to filter coefficients of the filter mask are across a boundary, wherein the boundary comprises one of a slice boundary between a first slice and a second slice or a tile boundary between a first tile and a second tile;
   based on the determination that the second group of one or more pixels corresponding to the filter coefficients of the filter mask are across the boundary, defining a partial adaptive loop filter, wherein defining the partial adaptive loop filter comprises:
      removing, from the filter mask, first filter coefficients corresponding to the one or more pixels across the boundary;
      removing, from the filter mask, at least a portion of second filter coefficients corresponding to pixels on an inside of the boundary sufficient to maintain a symmetrical filter mask relative to the removed first filter coefficients; and
      creating a partial filter mask for the partial adaptive loop filter using filter coefficients that have not been removed from the filter mask, wherein the partial filter mask defines the partial adaptive loop filter; and
   performing adaptive loop filtering on the second pixel using a partial adaptive loop filter.

2. The method of claim 1, wherein defining the partial adaptive loop filter comprises:
   renormalizing the partial filter mask, wherein performing adaptive loop filtering comprises performing adaptive loop filtering on the second pixel using the partial adaptive loop filter with the renormalized partial filter mask.

3. The method of claim 1, wherein the video coding process is a video encoding process, the method further comprising:
   encoding a block of video data to form an encoded block of video data; and
   reconstructing the encoded block of video data to form a reconstructed block of video data, wherein the second pixel is within the reconstructed block of video data.

4. The method of claim 1, wherein the video coding process is a video decoding process, the method further comprising:
   receiving an encoded block of video data; and
   performing a prediction process to form a reconstructed block of video data, wherein the second pixel is within the reconstructed block of video data.

5. The method of claim 1, wherein determining, for the second pixel, that the one or more pixels corresponding to the filter coefficients of the filter mask for the adaptive loop filter are across the boundary comprises determining the second pixel is located in one of the first slice or the first tile and the one or more pixels corresponding to the filter coefficients of the filter mask for the adaptive loop filter are located in one of the second slice or the second tile.

6. The method of claim 1, further comprising:
   receiving video data comprising the filter coefficients at a receiver of a wireless communication device;
   storing the filter coefficients on a memory of the wireless communication device; and
   processing the video data on one or more processors of the wireless communication device.

7. The method of claim 6, wherein the wireless communication device comprises a telephone handset and wherein receiving the video data at the receiver of the wireless communication device comprises demodulating, according to a wireless communication standard, a signal comprising the video data.

8. An apparatus configured to perform adaptive loop filtering in a video coding process, the apparatus comprising:
   a memory configured to store filter coefficient information; and
   one or more processors configured to:
      receive filter coefficients of a filter mask for an adaptive loop filter;
      determine, for a first pixel, that all pixels corresponding to filter coefficients of the filter mask are within a boundary;
      based on the determination that all pixels corresponding to the filter coefficients of the filter mask are within the boundary, performing adaptive loop filtering on the first pixel using all the filter coefficients of the filter mask;
      determine, for a second pixel, that one or more pixels corresponding to filter coefficients of the filter mask are across a boundary, wherein the boundary comprises one of a slice boundary between a first slice and a second slice or a tile boundary between a first tile and a second tile;
      based on the determination that the second group of one or more pixels corresponding to the filter coefficients of the filter mask are across the boundary, define a partial adaptive loop filter, the video coder is further configured to:

remove, from the filter mask, first filter coefficients corresponding to the one or more pixels across the boundary;

remove, from the filter mask, at least a portion of second filter coefficients corresponding to pixels on an inside of the boundary sufficient to maintain a symmetrical filter mask relative to the removed first filter coefficients; and create a partial filter mask for the partial adaptive loop filter using filter coefficients that have not been removed from the filter mask, wherein the partial filter mask defines the partial adaptive loop filter; and perform adaptive loop filtering on the second pixel using the partial adaptive loop filter.

9. The apparatus of claim 8, wherein the video coder is further configured to:

renormalize the partial filter mask, wherein performing adaptive loop filtering comprises performing adaptive loop filtering on the second pixel using the partial adaptive loop filter with the renormalized partial filter mask.

10. The apparatus of claim 8, wherein the video coder is a video encoder, and wherein the video encoder is further configured to:

encode a block of video data to form an encoded block of video data; and reconstruct the encoded block of video data to form a reconstructed block of video data, wherein the second pixel is within the reconstructed block of video data.

11. The apparatus of claim 8, wherein the video coder is a video decoder, and wherein the video decoder is further configured to:

receive an encoded block of video data; and perform a prediction process to form a reconstructed block of video data, wherein the second pixel is within the reconstructed block of video data.

12. The apparatus of claim 8, wherein to determine, for the second pixel, that the one or more pixels corresponding to the filter coefficients of the filter mask for the adaptive loop filter are across the boundary, the video coder is further configured to determine the second pixel is located in one of the first slice or the first tile and the one or more pixels corresponding to the filter coefficients of the filter mask for the adaptive loop filter are located in one of the second slice or the second tile.

13. The apparatus of claim 8, wherein the apparatus comprises a wireless communication device, and wherein the apparatus further comprises a receiver configured to receive the 3D video data.

14. The apparatus of claim 13, wherein the wireless communication device comprises a telephone handset and wherein the receiver is configured to demodulate, according to a wireless communication standard, a signal comprising the 3D video data.

15. An apparatus configured to perform adaptive loop filtering in a video coding process, the apparatus comprising:

means for receiving filter coefficients of a filter mask for an adaptive loop filter;

means for determining, for a first pixel, that all pixels corresponding to filter coefficients of the filter mask are within a boundary;

means for performing adaptive loop filtering on the first pixel using all the filter coefficients of the filter mask based on the determination that all pixels corresponding to the filter coefficients of the filter mask are within the boundary;

means for determining, for a second pixel, that one or more pixels corresponding to filter coefficients of the filter mask are across a boundary, wherein the boundary comprises one of a slice boundary between a first slice and a second slice or a tile boundary between a first tile and a second tile;

means for defining, based on the determination that the second group of one or more pixels corresponding to the filter coefficients of the filter mask are across the boundary, a partial adaptive loop filter, wherein the means for defining the partial adaptive loop filter comprises:

means for removing, from the filter mask, first filter coefficients corresponding to the one or more pixels across the boundary;

means for removing, from the filter mask, at least a portion of second filter coefficients corresponding to pixels on an inside of the boundary sufficient to maintain a symmetrical filter mask relative to the removed first filter coefficients; and means for creating a partial filter mask for the partial adaptive loop filter using filter coefficients that have not been removed from the filter mask, wherein the partial filter mask defines the partial adaptive loop filter; and means for performing adaptive loop filtering on the second pixel using a partial adaptive loop filter.

16. The apparatus of claim 15, wherein the means for defining the partial adaptive loop filter comprises:

means for renormalizing the partial filter mask, wherein the means for performing adaptive loop filtering comprises means for performing adaptive loop filtering on the second pixel using the partial adaptive loop filter with the renormalized partial filter mask.

17. The apparatus of claim 15, wherein the video coding process is a video encoding process, the apparatus further comprising:

means for encoding a block of video data to form an encoded block of video data; and means for reconstructing the encoded block of video data to form a reconstructed block of video data, wherein the second pixel is within the reconstructed block of video data.

18. The apparatus of claim 15, wherein the video coding process is a video decoding process, the apparatus further comprising:

means for receiving an encoded block of video data; and means for performing a prediction process to form a reconstructed block of video data, wherein the second pixel is within the reconstructed block of video data.

19. The apparatus of claim 15, wherein the means for determining, for the second pixel, that the one or more pixels corresponding to the filter coefficients of the filter mask for the adaptive loop filter are across the boundary comprises means for determining the second pixel is located in one of the first slice or the first tile and the one or more pixels corresponding to the filter coefficients of the filter mask for the adaptive loop filter are located in one of the second slice or the second tile.

20. A non-transitory computer-readable storage medium storing instructions that, when executed, cause one or more processors configured to perform a video coding process to:

receive filter coefficients of a filter mask for an adaptive loop filter;

determine, for a first pixel, that all pixels corresponding to filter coefficients of the filter mask are within a boundary;

based on the determination that all pixels corresponding to the filter coefficients of the filter mask are within the boundary, perform adaptive loop filtering on the first pixel using all the filter coefficients of the filter mask;

determine, for a second pixel, that one or more pixels corresponding to filter coefficients of the filter mask are across a boundary, wherein the boundary comprises one of a slice boundary between a first slice and a second slice or a tile boundary between a first tile and a second tile;

based on the determination that the second group of one or more pixels corresponding to the filter coefficients of the filter mask are across the boundary, define a partial adaptive loop filter, wherein to define the partial adaptive loop filter the one or more processors are further configured to:

remove, from the filter mask, first filter coefficients corresponding to the one or more pixels across the boundary;

remove, from the filter mask, at least a portion of second filter coefficients corresponding to pixels on an inside of the boundary sufficient to maintain a symmetrical filter mask relative to the removed first filter coefficients; and create a partial filter mask for the partial adaptive loop filter using filter coefficients that have not been removed from the filter mask, wherein the partial filter mask defines the partial adaptive loop filter; and perform adaptive loop filtering on the second pixel using the partial adaptive loop filter.

21. The non-transitory computer-readable storage medium of claim 20, wherein to define the partial adaptive loop filter, the one or more processors are further configured to:

renormalize the partial filter mask, wherein performing adaptive loop filtering comprises performing adaptive loop filtering on the second pixel using the partial adaptive loop filter with the renormalized partial filter mask.

22. The non-transitory computer-readable storage medium of claim 20, wherein the video coding process is a video encoding process, and wherein the one or more processors are further configured to:

encode a block of video data to form an encoded block of video data; and reconstruct the encoded block of video data to form a reconstructed block of video data, wherein the second pixel is within the reconstructed block of video data.

23. The non-transitory computer-readable storage medium of claim 20, wherein the video coding process is a video decoding process, and wherein the one or more processors are further configured to:

receive an encoded block of video data; and perform a prediction process to form a reconstructed block of video data, wherein the second pixel is within the reconstructed block of video data.

24. The non-transitory computer-readable storage medium of claim 20, wherein to determine, for the second pixel, that the one or more pixels corresponding to the filter coefficients of the filter mask for the adaptive loop filter are across the boundary, the non-transitory computer-readable storage medium stores further instructions that when executed by the one or more processors cause the one or more processors to determine the second pixel is located in one of the first slice or the first tile and the one or more pixels corresponding to the filter coefficients of the filter mask for the adaptive loop filter are located in one of the second slice or the second tile.

* * * * *